June 10, 1969
B. J. ECKELKAMP ET AL
3,449,725
AUTOMATIC DIGITAL DATA PROCESSING SYSTEM
FOR CONTINUOUS FLOW ANALYSIS
Filed Oct. 11, 1966
Sheet 2 of 3
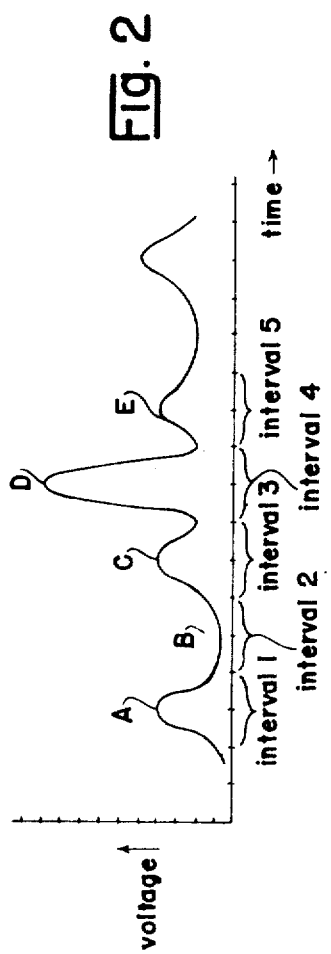
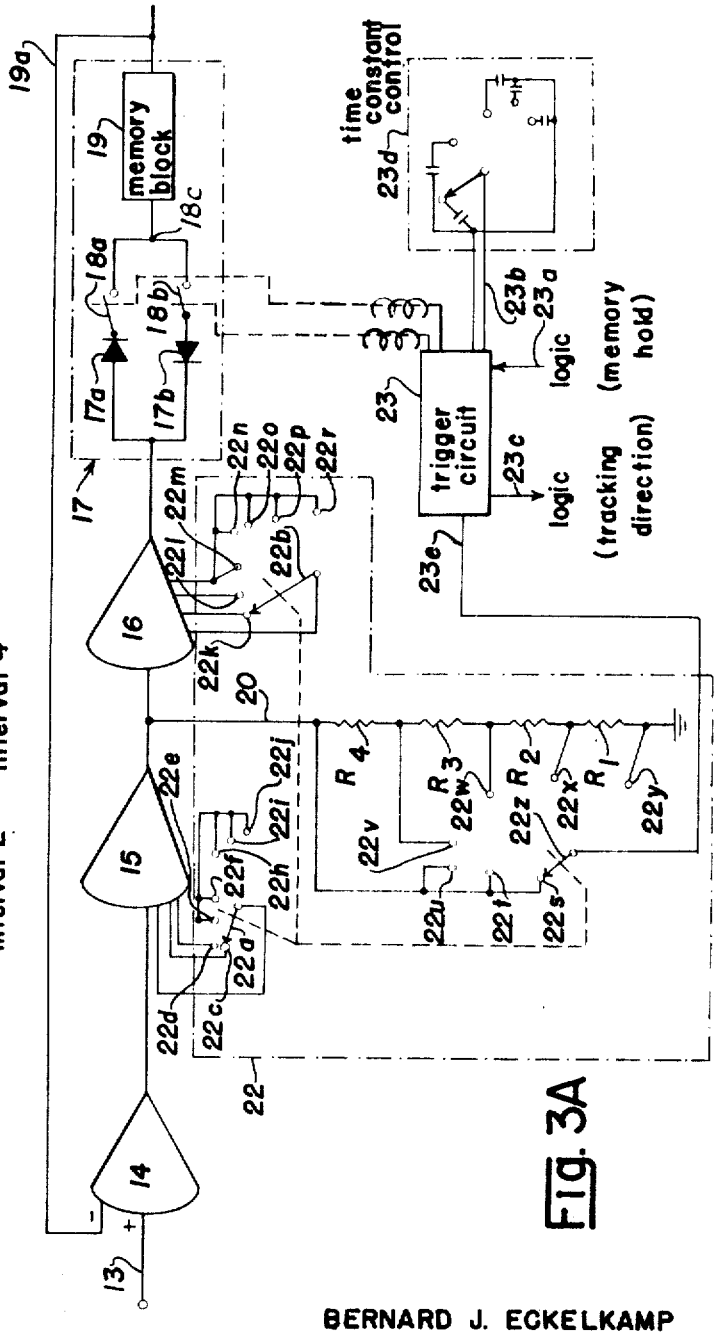
BERNARD J. ECKELKAMP
DAVID W. SPENCE
INVENTOR.
BY Hayden & Pravel
ATTORNEYS

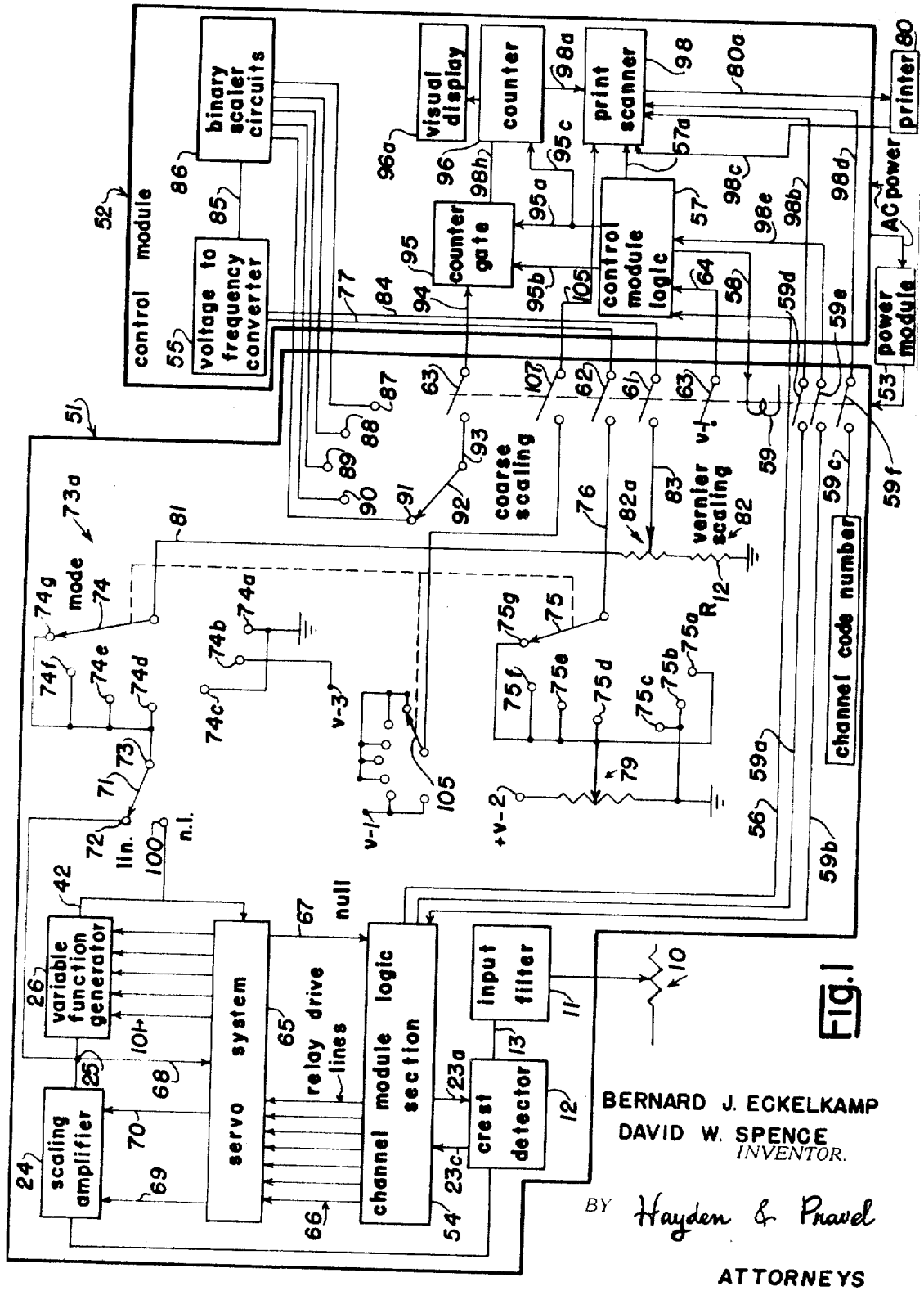

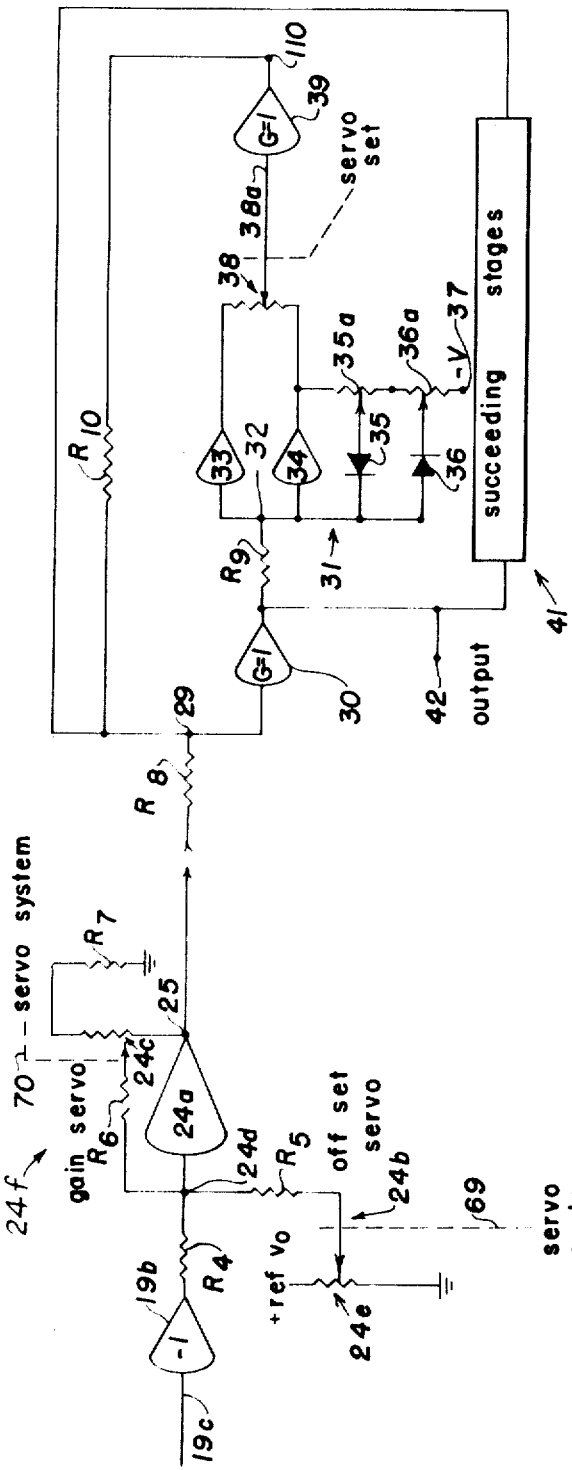

United States Patent Office 3,449,725
Patented June 10, 1969

3,449,725
AUTOMATIC DIGITAL DATA PROCESSING SYSTEM FOR CONTINUOUS FLOW ANALYSIS
Bernard J. Eckelkamp and David W. Spence, Houston, Tex., assignors to Infotronics Corporation, Inc., a corporation of Texas
Filed Oct. 11, 1966, Ser. No. 585,812
Int. Cl. G11b 13/00
U.S. Cl. 340—172.5                 8 Claims

ABSTRACT OF THE DISCLOSURE

An automatic data processing system for use with analytical measuring instruments. This system includes a number of analog measurement signal input channels, a common time-shared analog-to-digital converter and a printer for providing a readable record of the analytical measurements. This system also includes automatic scaling and calibrating circuits for enabling the record to be printed in directly readable clinical-type measurement units.

---

The present invention relates to automatic data processing and more particularly to an automatic data processing readout system for continuous flow analyses.

In general terms, the present invention includes a system of solid state electronic circuitry which automatically calibrates its own response and then detects, digitizes, and scales the maximum peak heights in an analog signal provided by an external transducer and prints the result of these operations in directly readable units commonly employed by the technician.

Various transducers provide an analog output signal in the form of a fluctuating voltage wherein the amplitude of the voltage in the signal is analogous to some unknown quantity or quality at the input to the transducer. For example, in colorimetric analysis, the percentage concentration of certain chemicals in a given solution is related to the percent transmission of light through the solution. This relation is employed in the colorimeter by direct correlation of the intensity of a light shining through a test sample solution to the magnitude of a variable voltage derived from a photoelectric cell. The output voltage from the colorimeter is thus directly related to the intensity of the light shining through the test solution which in turn is related to the percent concentration of a chemical in the solution. However, as will be amplified hereinafter, the function relating the percent light transmission through a solution and percent concentration of a given chemical in that solution may or may not be linear. When the function is nonlinear, direct conversion of voltage amplitude into percent concentration is a tedious and exacting task.

In continuous flow colorimetric analysis, new samples are continually introduced to the colorimeter in separate sample cups at fixed time intervals. The output signal from the colorimeter in continuous flow analysis has a waveform of alternating voltage peaks and valleys with the amplitude of each peak corresponding to the percentage concentration of a particular chemical in a given sample and the valleys between peaks corresponding to the value of voltage emitted at the output of the colorimeter between test samples. The amplitudes of the peak excursions are measured from base line or quiescent voltage corresponding to a zero concentration input sample.

The output from the colorimeter is recorded on a strip chart recorder by a moving slide wire shaft. The recorded analog signal derived from the colorimeter is usually examined by a chemist or clinical laboratory technician who measures the amplitude of the peak excursion, numbers the peak to relate it to the sample from which it was derived, and converts the measured amplitude of the peak excursion into appropriate clinical units of concentration.

To insure accuracy of results, the colorimeter must be calibrated at periodic intervals by contrasting the output of the colorimeter with the known concentration of a particular chemical in a standard test sample. When the relation for a chemical is nonlinear, several different test samples covering the desired concentration range must be used in determining the accuracy of the analysis. This latter requirement is imposed by the fact that the relationship between the amplitude of the excursion on the strip chart and the percentage concentration of the chemical is not linear. Thus, for an excursion of 15% chart width, the concentration of a given chemical in the sample is 30% while for an excursion of 30% chart width, the concentration of the same chemical is only 40%.

The relationship between percent light transmission and percentage concentration of a given chemical may be a linear, exponential, or other function, depending on the particular chemical being tested. The technician must adequately provide for these variables when calibrating the colorimeter or when converting its output into clinical units. Transducers such as the colorimeter have been employed in chemical analyses, and clinical pathology involving such tests, as glucose, sodium, potassium, enzymes, total protein, chlorides, chloresterol, etc., and many skilled technicians have been required in reducing the output of the colorimeter into proper clinical form.

It is, therefore, an object of the system of the present invention to provide means for automatically printing the information contained in an analog signal derived from a colorimeter or the like in directly readable clinical units.

It is also an object of the system of the present invention to automatically distinguish betwen valid and invalid peak values in an analog signal, detect the occurrence of a valid peak value in the analog signal, and print out the analog value thus detected in directly readable, commonly employed clinical units.

It is a further object of the system of the present invention to reduce the number of components required in continuous flow analysis by providing means for selectively distributing a shared control module among multiple input channels.

It is also an object of the present invention to provide means for detecting a valid peak in a continuous waveform, storing the value of the valid peak until such time as it may provide the input to the shared-time components of the system.

It is also an object of the system of the present invention to provide means which may be connected directly to the output of an external transducer such as a colorimeter or the like to convert the analog output signal of the transducer into a directly usable form.

It is a further object of the present invention to provide means for detecting the peak values in an analog signal, automatically calibrating its response and printing out in scaled, directly readable clinical units, the information contained in the analog signal for linear as well as nonlinear functions.

It is also an object of the present invention to provide means for eliminating the need for manual data reduction, transducer calibration and other nonautomatic means for converting an analog signal into its final form.

These and other objects of the system of the present invention will become more readily apparent from the following specification and drawings wherein:

FIG. 1 of the drawings illustrates a block diagram of the system of the present invention;

FIG. 2 of the drawings illustrates a calibration sequence used by the system of the present invention in automatically setting its own response;

FIG. 3A of the drawings illustrates the crest detector of the present invention;

FIG. 3B illustrates the scaling amplifier of the present invention; and

FIG. 3C illustrates the variable function generator of the present invention.

Referring now to the block diagram of FIG. 1 of the drawings, the input signal to the automatic circuitry of the present invention is taken from a recorder retransmitting potentiometer indicated generally at 10. The pickoff arm is moved along the resistance winding of the potentiometer 10 in accordance with the physical movement of the slide wire shaft of a strip chart recorder. It should be understood that the input signal may be taken directly from the detector of the colorimeter; however, the use of the recorder retransmitting potentiometer 10 permits the system of the present invention to advantageously use the characteristics of the recorder and is therefore preferred.

The automatic system of the present invention is broken into three separate modules indicated generally as a channel module 51, a control module 52, and a power module 53. The power module 53 supplies the power for driving the various relays employed in both the channel module 51 and the control module 52 as well as power supplies for logic and analog circuitry. While only a single channel module 51 will be described in detail, it should be understood that the control module 52 and the power module 53 may be shared by any desired number of channel modules to form a system capable of handling multiple, simultaneously operating, synchronized or unsynchronized, continuous flow chemical analyzers.

The analog input signal from the recorder retransmitting potentiometer 10 is input to a two section signal filter 11 having an RC time constant which is variable as a function of the number of samples per hour being introduced into the colorimeter during continuous flow analysis, thus giving optimum filtering for any given sample rate. The filter 11 reduces unwanted noise in the analog signal with a minimum of amplitude and phase distortion. As will be apparent hereinafter, any distortion introduced into the analog input signal by the filter 11 is compensated, or is of minor significance in that the response setting of the system is made using the distorted signal and the distortion is consequently calibrated out.

The filtered signal from the filter 11 appears on the line 13 where it forms the input to a crest detector 12. The crest detector 12 continuously monitors the filtered output analog signal of the colorimeter and detects those excursions in the analog signal which have an amplitude above some predetermined minimum value. When an excursion detected by the crest detector 12 begins to go negative in slope, corresponding to the occurrence of a peak in the analog signal at that point, a binary level signal is conveyed by the logic tracking direction conductor 23c to a central channel logic section 54. The logic section 54 returns a binary level logic signal on the memory hold line 23a which causes the crest detector 12 to retain the detected peak value in an analog memory.

The value stored in the analog memory of the crest detector 12 forms the input to a scaling amplifier 24. The offset and gain controls of the scaling amplifier 24 are automatically adjusted in response to appropriate signals on the lines 68, 69, and 70, respectively, to provide the desired base line and peak values of the analog signal. These adjustments are the first steps in scaling the signal so that the printout of the system may be directly in the desired clinical units. Thus, the scaling amplifier 24 provides an output signal having a fixed span (maximum signal amplitude minus minimum signal amplitude) irrespective of the span of the signal as it appears at the input to the scaling amplifier 24 within the design limits of the system.

If the relationship between the percent transmission of light through the test solution and percent concentration of a given chemical in the solution is linear, a response selector 71 is manually set to a terminal 72 so that the signal output from the scaling amplifier 24 is communicated directly to a point 73.

If the relationship between percent transmission of light through the test solution and percent concentration of a given chemical in the solution is nonlinear, the response selector 71 is set to a terminal 100. In the nonlinear response position, the variable function generator 26 is employed as a second scaling means. The signal appearing at the terminal 25 is scaled in accordance with the function generated by the variable function generator 26 for a readout directly in the customary clinical units. The function generated by the generator 26 approximates the nonlinear relationship between percent light transmission through a solution and the percent concentration of a given chemical in that solution. The function controls indicated generally at 101 activate appropriate mechanisms to form a multiple, straight line segment, approximation to the true function.

The appropriately scaled analog signal appears at the point 73 where it forms a portion of the input to the terminals of a mode control indicated generally at 73a. As will be hereinafter explained more fully, the RESET (74c), SET SPAN (74b), and SET MIN (74a) modes of the control 73a are employed when programming or setting certain of the limiting values of the system response.

When the mode switch 74 is in any of the positions 74e, 74f, or 74g, corresponding to AUTO 1, AUTO 2, or AUTO 6, respectively, the system automatically calibrates its response. In the AUTO 1 (74e) mode, the response is calibrated at only the minimum concentration level; in the AUTO 2 (74f) mode, used with linear response or where nonlinearity is constant, the maximum and minimum concentration point levels are calibrated; in the AUTO 6 (74g) position, the system will automatically recalibrate itself at six concentration levels based on a multiple sample standard input. In the MANUAL mode (74d), normal peak detection and digitization are allowed and the response of the system may be manually calibrated. In any of the automatic modes, the frequency of recalibration may be set for any desired interval. It should be understood that the specific modes here described are merely illustrative and that any desired number of concentration levels may be used in the automatic calibration sequences, depending on the requirements of the situation.

When the switch 74 is in the AUTO 6 (74g), AUTO 2 (74f), AUTO 1 (74e) or MANUAL (74d) modes, the scaled analog input signal is conducted along the line 81 to a potentiometer 82a and thereafter to a fixed resistor $R_{12}$. The potentiometer 82 and fixed resistor $R_{12}$ form a vernier scaling control indicated generally at 82 with an attenuation range from 1:1 to slightly in excess of 2:1 in the preferred embodiment. The seven position mode switch 74 is ganged with a second switch 75 which forms a portion of an output minimum control indicated generally at 79. The control 79 is employed in setting the minimum readout value for minimum concentration in a manner to be hereinafter described in greater detail.

In a multichannel system, rather than the single channel system described herein, the control module 52 is shared by several different channels. As a consequence, the control module 52 must select a particular channel from which information is to be received. The channel 51 indicates that it is ready to transmit information to the control module 52 by a binary level signal initiated on the "digitize request" line 56. When the control module 52 is prepared to accept the information from the channel module 51, a solenoid 59 is activated by a signal transmitted over the "select" line 58 from the control module logic 57. Activation of the solenoid 59 closes the ganged relays 59f, 59e, 59d, 60, 61, 62, and 63. When the relays have closed, a voltage v–1, corresponding to a binary level voltage, is conveyed along the line 64 to the logic 57 to indicate completion of the channel selection.

Upon closing of the relays 62 and 61, the scaled analog signal is transmitted along the lines 77 and 84 to form an input to a voltage-to-frequency converter 55. The amplitude of the sum of the voltages appearing on the lines 77 and 84 is converted by the voltage-to-frequency converter 55 into binary pulses. The binary pulses appearing on the line 85 have a frequency rate which is proportional to the amplitude of the input voltage to the voltage-to-frequency converter 55. The voltage-to-frequency converter thus converts the analog signal from the channel module 51 into a binary signal on the line 85.

The binary signal on the line 85 forms the input for the binary scalar circuits 86. The binary scalar circuits 86 comprise a series of flip-flop circuits (five are illustrated) which scale the frequency of the signal received from the voltage-to-frequency converter 55. For purposes of illustration, the frequency produced on the line 85 by a given voltage input to the voltage-to-frequency converter 55 may be scaled by the scalar circuits 86 to produce a pulse signal on the line 91 having a frequency the same as that of the pulse signal on the line 85; a frequency on the line 90 which is one-half the frequency on the line 85; a frequency on the line 89 which is one-fourth the frequency on the line 85; a frequency on the line 88 which is one-eighth the frequency on the line 85; and a frequency on the line 87 which is one-sixteenth the frequency on the line 85. Thus, the switch 92 may be used as a coarse scaling control to produce in conjunction with the vernier scaling control 82a previously discussed a direct readout in clinical units. It should be apparent that any number of series flip-flops may be employed, depending on the range desired in the coarse scaling control. The coarse scaling is accomplished in the digital part of the system so that no major decrease in analog signal is required to achieve the desired readout.

The digitized and scaled signal appearing on the switch 92 is carried by a conductor 93 through the closed relay 63 and by a conductor 94 to a counter gate 95. The gate 95 may consist of two NOR logic elements which are allowed to pass the signal on line 94 to line 98h for a fixed period of time as determined by the power line frequency to allow a counter 96 to accumulate the pulses appearing on the line 98h. The appropriate occurrence of the "selected" signal appearing on the line 64 and the action of the time base generator in the control module logic 57 initiates appropriate logic (the logical negation of start count and stop count) signals on the lines 95a and 95b, respectively, to gate the pulsed signal on the line 94 to the counter 96.

The data counter 96 consists of a series of binary-coded-decimal decade scalers which accumulate the pulses in the binary signal appearing on the line 98h. A visual display 96a affords a direct readout of the count in the data counter 96 and is used during the calibration of the system as will be explained. As an additional scaling expedient in obtaining a readout in directly readable clinical units, the signal appearing on the line 98h may be introduced at different stages in the decade data counters.

A print scanner 98 containing typical circuitry decodes the positions of a counter to provide appropriately timed pulses to enter a sample number from information presented on the input line 98b and a code number for each channel from information presented on the input line 98d and the data presented on the input line 98a from the data counter 96. Logic circuitry is included in the print scanner 98 for inhibiting operation of the printer 80 when the system is placed in the SET SPAN (74b) and SET MIN (74a) modes by the mode selector switch 74 as indicated by the binary level voltage v–1 appearing on the switch 105 and conveyed through the relay 107 along the line 106 to the print scanner 98.

An "end-of-print" logic signal is also generated by the print scanner logic to be returned to the channel module logic section 54 by the line 98e, through the closed relay 59e, and through the line 59b. The print scanner 98 also includes the binary-coded-decimal to decimal conversion circuitry as well as the solenoid drivers for the printer 80. The output of the print scanner 98 is conveyed to the printer 80 by the line 80a with printer completion being indicated to the print scanner 98 by appropriate signals on the line 98c.

The response of the system is calibrated by switching to one of the SET SPAN (74b) or SET MIN (74a) modes with the mode selector switch 74. As a preliminary step in calibrating the response, the selector switch 74 is manually moved to the RESET (74c) mode and then to the SET SPAN (74b) mode. In the SET SPAN (74b) mode, a fixed internal reference voltage v–3 is placed on the line 81. As will be more fully explained hereinafter, the fixed voltage v–3 is caused to be digitized by the control module 52 by manually inducing a "read" signal in the channel module logic section 54 which in turn produces a "digitize request" signal on the line 56. While in the SET SPAN (74b) mode, the digitized value of v–3 is repeatedly read out on the visual display 96a permitting visual coordination of the manual adjustment of the coarse scaling switch 92 and the vernier scaling control 82. The adjustment of the controls 92 and 82 is continued until the visual display at 96a gives a readout corresponding to the span between the minimum and maximum value of the analog input in clinical units.

In the SET SPAN (74b) and SET MIN (74a) modes, the repeated readout on the visual display 96a occurs when a simulated "end-of-print" signal is induced in the line 59b terminating the "read" signal in the channel module logic section 54. Termination of the "read" signal in turn terminates the "digitize request" signal on the line 56. The "end-of-print" signal is simulated rather than actual since, as was noted hereinbefore, printout is inhibited in the SET SPAN (74b) and SET MIN (74a) modes. The termination of the "end-of-print" signal initiates another "read" signal which starts the process over again, thus giving a continued or repeated visual readout at 96a.

When the span of the readout has been set, the switch 74 is moved to the SET MIN (74a) mode, thus placing zero or ground potential on the line 81. As in the SET SPAN (74b) mode, a repetitive readout on the visual display 96a is obtained and the output minimum potentiometer 79 may be manually adjusted until the desired minimum readout at 96a is obtained. The minimum output readout may or may not be zero, depending on the chemical analysis being employed. When the SET SPAN (74b) and SET MIN (74a) adjustments have been properly made, the printout of the printer 80 will be directly in the clinical units used by the technician.

As was noted hereinbefore, the system of the present invention automatically calibrates its response when it is in one of the automatic modes, ie., AUTO 1, (74e), AUTO 2 (74f) or AUTO 6 (74g). When the mode selector switch 74 is in one of the automatic modes, the channel module logic section 54 is appropriately signaled to initiate a calibration sequence by the occurrence of any one of the following three conditions:

(1) The occurrence of the first peak in the analog input signal after manually inducing a calibration sequence by directly stimulating the logic 54;

(2) The occurrence of the first peak in the analog input signal after manually moving the mode selector switch 74 from RESET (74c) into one of the automatic modes;

(3) The occurrence of the first peak after a predetermined number of samples have been introduced into the colorimeter.

The automatic calibration sequence for the AUTO 2 (74f) mode may best be described by reference to FIG. 2 of the drawings. FIG. 2 illustrates the analog voltage signal produced by providing an input to the colorimeter of a sequence of five samples having known concentrations of a certain chemical. The sequence is broken into five time intervals, with time increasing to the right along the horizontal axis. The vertical axis represents the magnitude of the voltage in the analog signal. The first interval includes a first peak A; the second interval includes a valley B (corresponding to a sample having zero concentration of the chemical); the third interval includes a peak C; the fourth interval includes a peak D; the fifth interval includes a peak E and subsequent intervals include the peaks from unknown concentration samples. Thus, peaks A–E represent the analog input for automatic calibration of the response of the system for the AUTO 2 (74f) mode. The first peak A, which occurs in the analog input signal after any one of the three conditions listed above has occurred, initiates a calibration and is digitized and printed by the printer 80 based on some previous calibration. The first peak A corresponds to the first sample of known chemical concentration introduced into the input of the colorimeter during the calibration sequence and is preferably chosen to produce a peak value of approximately 40% of the span of the sequence. The 40% figure is selected as representative of a good mid-value figure for triggering purposes and also for buffering the swing in the analog signal from minimum to maximum values. When the first peak A is is detected, the preprogrammed AUTO 2 (74f) calibration sequence is initiated. During this sequence, the sample interval counter in the logic 54 is inhibited and a calibration sequencing counter is allowed to count the sample intervals. During calibration sample interval number two, the OFFSET control of the scaling amplifier 69 is automatically adjusted to match the internal standard reference voltage appearing on line 81 in the SET MIN (74a) position of the mode switch. The adjustment of the OFFSET control will be initiated by the crest detector 12 if the minimum value in the analog signal of the calibration sequence is also a peak or by the end of the monitor time interval if the minimum is also the base line, where the monitor interval is defined as the time within which the next valid peak is expected, as will be hereinafter described in greater detail. In the latter case, calibration of the OFFSET will be based on the value being read at the end of the monitor interval. The third sample of the sequence corresponding to the peak C is used as a buffer between the minimum and the maximum values so that the following maximum value will be more nearly representative of a maximum signal occurring in the midst of average samples. The fourth sample, corresponding to peak D, is used as a reference for the maximum concentration level and the GAIN control of the scaling amplifier 24 is automatically adjusted to match the output signal appearing at the terminal 25 with the internal standard reference voltage $v$–3 appearing on line 81 in the SET SPAN (74b) position of the mode switch. The fifth sample is added as a check on the calibration results as well as to provide a sample near the middle of the normal operating range preceding the first unknown sample. The calibration sequence may be identified on the output list since the sample number will always be printed as zero by the printer 80. It will, of course, be readily apparent that any number of samples having known percentage concentrations may be employed in an automatic calibrating sequence. Thus, as has been noted hereinbefore, in the AUTO 6 (74g) mode, six values in addition to the standard 40% values are employed in the calibration sequence.

It will be understood by those having ordinary skill in the art that while the system of the present invention is a novel combination, the means for achieving the various functions performed by the logic 54, the servosystem 65, the control module 52, and the power module 53 are well known expedients within the art and their specific construction need not be further amplified. The function, structure, and interrelation of the crest detector 12, the scaling amplifier 24, and the variable function generator 26 employed herein are, however, considered to be new and will therefore be described in greater detail. Thus, FIGS. 3A, 3B, and 3C of the drawings illustrate the crest detector 12, the scaling amplifier 24, and the variable function generator 26, respectively, of the present invention in greater detail.

As illustrated in FIG. 3A of the drawings, the filtered analog input signal is conveyed to the crest detector 12 by a conductor 13. The crest detector 12 detects and stores the peak values of the analog input signal in an analog memory referred to generally at 17. As will be explained in greater detail, the memory 17 is a unidirectional charging circuit which holds the peak value of a valid excursion in the input signal and emits a command signal when the input to the crest detector 12 goes below this value.

The crest detector 12 includes a fixed gain, differential amplifier 14 the output of which is communicated to a variable gain operational amplifier 15. The amplified input signal is communicated from the amplifier 15 to a second variable gain operational amplifier 16 and, thereafter, to the analog memory 17. The analog memory 17 includes a pair of semiconductor diodes 17a and 17b. It will be noted that the polarities of the diodes 17a and 17b are reversed so that the diodes conduct oppositely. Each of the parallel diodes 17a and 17b is connected in series with a magnetically activated relay 18a and 18b, respectively. The relays 18a and 18b are connected to a common point 18c which in turn is connected to a memory block 19. By way of example, rather than limitation, the analog memory block 19 may consist of a high quality polystyrene capacitor for storing the peak signal value with the potential across the capacitor being appropriately supplied as the input to a MOS field-effect transistor. The MOS field-effect transistor has a very high input impedance, thus preventing loss of the charge stored within the capacitor.

The output from the memory block 19 is fed back to the differential amplifier 14 along the line 19a. A rate signal proportional to the difference between the output and the input of the crest detector 12 is generated at the output of operational amplifier 15. This signal is carried on line 20 through the minimum peak height control (indicated generally at 22) through the position 22s and wire 23e to the trigger circuit 23. When the magnitude of the signal on the line 13 goes below the value stored in the analog memory block 19, the voltage on the line 23e is driven negative. It will be appreciated that the latter event corresponds with the presence of a peak in the analog input signal. When the value of the negative voltage on the line 23e exceeds some predetermined level for a time interval determined by the time constant control 23d, a trigger circuit 23 is tripped. Conversely, when a valley in the analog input signal occurs, a positive voltage appears on the line 23e, and this positive voltage, if it is sufficiently large for a sufficient time, trips the trigger circuit 23 back in the other direction. When the voltage on the line 23e goes sufficiently positive for the necessary time, corresponding to detection of a valley in the analog signal, the trigger 23 trips to close the relay 18a while the relay 18b is opened, thus allowing the crest detector to track an increasing analog input signal. When the voltage on the line 23e goes sufficiently negative for the necessary time, the trigger 23 trips to open the relay 18a and attempts to close the relay 18b. However, the latter sequence initiates a binary level logic signal on the line 23c which is communicated to the logic 54. The logic 54 returns a "memory hold" (or "read") signal on the line 23a to keep both relays 18a and 18b open. It will be appreciated that the time delay inherent in activating the physical components of the mechanical relay 18b permits ample time for the electronic signals on the lines 23a and 23c to thwart the closing of the relay 18b. With both of the relays 18a and 18b open, the value of the signal stored in the memory block 19 remains fixed, thus allowing the control module 52 to digitize the peak value. When the peak value held in the memory 19 has been digitized, the loss of the "memory hold" signal from the logic 54 appearing on the line 23a corresponding to the termination of the "read" signal allows the relay 18b to close, thus allowing the crest detector 12 to track a decreasing analog input signal. It should be pointed out that the above described relay control technique not only provides tracking direction control but also tends to reduce the effects on the memory holding characteristics of the less-than-infinite, reverse biased diode impedance by removing the diodes 17a and 17b from the circuit in the "hold" condition.

The requirement that the trigger circuit input on the line 23e be above the minimum level for a particular time interval is imposed to eliminate unwanted readouts due to the higher frequency content of the input analog signal on the line 13. As a further means of eliminating unwanted readouts due to signal noise, in particular low frequency noise, the minimum peak height control indicated generally at 22 is provided. Two techniques may be employed to provide a wider range of minimum peak height adjustment. Section 22a, which is ganged with sections 22b and 22z, decreases the gain of the operational amplifier 15 in positions 22d and 22e so that a successively larger error between the input and output of the crest detector 12 is required to produce the fixed trigger level on the line 23e for peak detection. Positions 22f, 22h, 22i, and 22j maintain the gain of the operational amplifier 15 constant. However, section 22z of the minimum peak height control decreases the portion of the error signal on the line 20 which is transmitted to the line 23e through positions 22v, 22w, and 22x, again increasing the amount of error between the input and the output of the crest detector 12 required for peak or valley detection.

The gain settings of the operational amplifiers 15 and 16 are ganged with the gain of the amplifier 16 being increased as the gain of the amplifier 15 is decreased. This latter feature provides a constant loop gain in the crest detector 12 whereby the peak sensing sensitivity of the crest detector may be altered without changing the percentage error of the crest detector output.

The output from the crest detector 12 forms the input to the scaling amplifier 24. The primary function of the scaling amplifier 24 is to mix the output of the crest detector 12 appearing on the line 12c, with an offset voltage, and, to vary the forward gain of the analog signal so that a desired amplifier output span may be obtained for a range of input spans. The scaling amplifier 24 thus provides a fixed span of from zero to five volts in the preferred embodiment, irrespective of the input span, wtihin the design limits, and is the first step in scaling the system output into clinical units which are directly readable by the technician.

The input to the scaling amplifier 24 is taken through an inverting amplifier 19b having a fixed gain of $-1$, through a fixed resistor $R_4$ to a terminal 24d where it forms the input to an amplifier 24a which is also provided with a large, negative gain. The offset and gain of the amplifier 24a are automatically set by servomechanisms in response to direction by the channel module logic or they may be manually set, depending upon the mode selected. The analog, offset control indicated generally at 24e is the first control automatically set in the calibration sequence and is used to set the output of the scaling amplifier 24 to zero voltage for the minimum concentration input (not necessarily zero concentration) to the colorimeter. The offset control 24e is automatically set by means of a servoset potentiometer indicated generally at 24b connected between ground potential and some positive reference voltage $+V$. The pickoff arm of the potentiometer 24b supplies the offset voltage to the terminal 24d through a fixed resistor $R_5$.

The analog gain control indicated generally at 24f is the second control set in the calibration sequence and is used to adjust the output of the scaling amplifier 24 to the proper level for maximum concentration input to the colorimeter. The gain control 24f is automatically set by means of a servoset potentiometer indicated generally at 24c which is connected between a fixed resistor $R_7$ and the output terminal 25. The voltage on the pickoff arm of the potentiometer 24c is supplied through a fixed resistor $R_8$ to the terminal 24d.

In understanding the automatic operation of the OFFSET control and GAIN control for the scaling amplifier 24, it is beneficial to refer back to the description of the operation of the system in the AUTO 2 (74f) mode. In the AUTO 2 (74f) mode, the presence of a "read" signal and the presence of the second interval in the calibration sequence (the valley B) causes the logic 54 to pull in selection relays in the servosystem 65 by signals on the relay drive lines 66. The selected relay selects the appropriate reference voltage and servomotor in the servosystem 65 as well as the correct source for the unknown signal. When the servomotor driving the pickoff arm of the potentiometer 24b reaches a null as determined by the magnitude of the voltage across the servomotor, a trigger circuit in the servosystem is tripped to give a null indication on the line 67. When a null indication occurs on the line 67, a "digitize request" signal is initiated on the line 56 by the logic 54. This produces a readout which can be examined to determine how precisely the calibration was actually effected. During the time that the servo selection relays are pulled in, a null signal must be present on the line 67 to initiate a "digitize request" on the line 56. This latter requirement is imposed to prevent digitizing by the control module 52 until such time as calibration to the desired point has been effected.

In a multichannel system, the logic 57 is constantly scanning in search of channels which are prepared to have their signals digitized. When the "digitize request" signal appears on the line 56, the logic 57 ceases its scanning and locks in on the channel module 51 by placing a "select" signal on the line 58 to the solenoid 59. This pulls in all of the relays ganged on the solenoid 59. When the printer 80 has completed its printout, an "end-of-print" signal is generated by the logic 57 and carried on the line 59b to the logic 54. The "end-of-print" signal terminates the "read" signal which in turn terminates "servoselection" and "digitize request" signals. The gain control is automatically set in a similar manner, but as will be understood, the adjustment occurs in the fourth interval of the calibration sequence in the AUTO 2 (74f) mode. The signal on the line 68 is the unknown input to the servoamplifier of the servosystem 65 during the adjustments of the GAIN and OFFSET controls.

The output of the scaling amplifier 24 is communicated to the variable function generator 26 where it is fed through a fixed resistor $R_8$ to a terminal 29. The signal is communicated from the terminal 29 to an amplifier 30 having a fixed gain of 1. The output of the amplifier 30 is communicated to a terminal 32 through a fixed resistor $R_9$. The amplifier 30 is used to provide a low impedance output at 42 and is driven by the mixing point voltage at 29. The signal at the point 32 is supplied to a fixed, positive gain amplifier 33, a fixed negative gain amplifier 34, and an adjustable limiting circuit indicated generally at 31. The limting circuit 31 includes two semiconductor diodes 35 and 36 connected in parallel with their polarities reversed. The pickoff arms of two manually set potentiometers 35a and 36a are provided in series with the diodes 35 and 36, respectively.

The potentiometer 36a is connected between a negative supply voltage $-V$ at the terminal 37 and the potentiometer 35a, and the potentiometer 35a in turn is connected between the potentiometer 36a and the output of the amplifier 34. A servoset potentiometer 38 is connected across the output of the amplifiers 33 and 34. The voltage on the pickoff arm of the potentiometer 38 is supplied to a second amplifier 39 having a fixed gain of 1 with the output from the amplifier 39 being fed back to the terminal 29 through a fixed resistor $R_{10}$.

The semiconductor diodes 35 and 36 acting with the potentiometers 35a and 36a act as a voltage limiting circuit with the limit value being determined by manually setting the potentiometers 35a and 36a. Four voltages in excess of those established by the limiting circuit 31, succeeding stages, indicated generally at 41, are employed.

Any number of stages similar to the stage described may be employed in the variable function generator 26 with each stage covering voltages between certain given values. The resultant function provided by the generator 26 is thus comprised of multiple straight line approximations to the desired function. The illustrated five function controls 101 provide five straight line segments (six points) approximating any nonlinear function relating percent light transmission through a chemical solution and percent chemical concentration. It will be understood that the greater the number of segments, the closer the correspondence of the function generated by the generator 26 with the actual function.

In the preferred form, the variable function generator 26 consists of five segments with the slope change points fixed at 0, 1, 2, 3, 4, and 5 volts as measured at the output. The slope of any segment can be adjusted to any value between ¼ and 4 times the average slope between the zero and five volt points and is independent of any other segment. When the slopes are adjusted in a particular sequence, independence of setting is obtained.

It will be apparent that as the voltage at the point 29 goes positive toward the maximum value to be supplied by the first stage of the generator 26, the amplifier 33 tends to go positive while the amplifier 34 tends to go negative. Depending upon the position of the pickoff arm of the servoset potentiometer 38, the voltage on the line 38a is either positive or negative. The signal on the line 38a is input to the buffer amplifier 39 with its fixed gain of one and is then fed back to the terminal 29. If the voltage on 38a is positive, positive feedback is present in the loop at 29 and the loop gain is greater than one, with a limiting value of gain approximately equal to the gain of the amplifier 33. If a negative voltage is picked off on the line 38a, negative feedback occurs and the loop gain is reduced to some value less than one. In the preferred embodiment where each stage of the generator 26 provides a one volt segment, the first stage in the generator 26 would supply the function segment from zero to one volt. The voltage at the point 110 remains constant no matter how high above one volt the voltage input at the point 29 may be. The one volt limit is determined by the setting of the potentiometer 36a while the zero volt limit (for a span of from zero to five volts) is set by the potentiometer 35a. The succeeding stages 41 of the generator 26 are exactly like the first stage here described, with appropriate adjustments being made in the limiting circuit of each stage to provide the desired break points in the generated function.

Having discussed all of the essential components of the system of the present invention, a summary of the action of the logic controls employed in the preferred embodiment of the system of the present invention will now be more meaningful.

The control logic section of the logic 54 receives the tracking direction information appearing on the lines 23c, and when the system is in one of the calibration modes, the control logic receives the "null" signal from the line 67 and combines these two logic signals to form a "digitize request" signal on the line 56. The control logic then uses the various signals from the "samples between calibration" and "calibration sequencing" logic to control whether or not the system is in a calibration sequence. The control logic also employs the indication of the "sample timing" circuitry to determine if a particular readout is in an appropriate time interval.

The "sample timing" logic employs digital circuitry to generate three timing pulses per sample interval. The synchronization of these three timing pulses is based on the occurrence of the first valid peak and the occurrence of each succeeding valid peak thereafter. After the first peak, a "valid" peak is defined as one which occurs during the "monitor interval." In the preferred form of the system, the first of the three pulses occurs at a point in time which is 50% through the interval between expected peaks in the analog input signal. The first pulse terminates one sample interval and starts the next sample interval. The second pulse occurs at 87½% of the monitor interval and initiates the start of the next monitor interval. The third pulse occurs at 112½% of the monitor interval, but only if a valid peak has not occurred. This third pulse terminates the monitor interval and forces a readout of the value stored in the analog memory block 19 at that time. A peak which occurs during the monitor interval terminates the interval and sets the time at which the next monitor interval will occur.

The "samples between calibrations" logic includes the typical counter and switching circuits, and where there is the appropriate coincidence of signals, the control logic is set up to initiate a new calibration cycle on the next valid peak in the analog signal, with the counter being reset upon going into a calibration sequence.

The "sample interval counter" counts the samples which have been read and is reset only by going to the RESET mode. As before noted, the count of the "sample interval counter" is inhibited during a calibration sequence.

The calibration sequencing logic of the logic 54 includes a counter which counts sample intervals during a calibration sequence and which is decoded to provide the "servoselection relay control" and "calibration termination" signals.

The "channel selection" logic of the logic 57 employs a squared off, 60 c.p.s. input and a multiposition counter, corresponding to the number of channels being employed in the system. When one of the channels generates a "digitize request" signal, the counter is stopped on that channel and a "select" signal is generated to pull in the relays ganged with the solenoid 59. When an "end-of-print" signal is generated, the counter is advanced to the next position to insure that any one of the other channels which is ready to be digitized can be selected. This latter feature prevents the loss of data caused by a lock-in condition at one position as occurs in the SET SPAN (74b) and SET MIN (74a) modes.

The digitizing time base logic of the logic 57 which also employs the squared off 60 c.p.s. input generates a continuous 4 c.p.s. squared off wave output for the monitor timing circuitry in each channel. When the "selected" signal is detected from any of the channels, a signal is generated starting the counter 96 and at a fixed time thereafter (one second in the preferred embodiment) a signal is generated to stop the counter 96. The proper combination of these latter two signals (the logical negation of "start count," "stop count") initiates the print scanner sequence.

It will be appreciated that the system of the present invention automatically calibrates its response and then detects, digitizes, and prints the maximum peak heights from any number of simultaneously operating synchronized or nonsynchronized colorimeters. By means of the output scaling controls and the automatically adjusted nonlinear calibration, the printout can be directly in concentration of any unknown. Recalibration is automatically effected by feeding a sequence of samples of known concentration to the colorimeter system at periodic intervals. The information in the printout of the system includes a channel code number, sample number, and concentration data.

Since the control module is comon to any desired number of channels, the size of the system is appreciably reduced. It will, however, be observed that each channel employed in the system is complete in the analog sense so that each channel has its own input filter, crest detector, offset and gain adjustment circuitry, automatic nonlinear calibration controls (including sequencing logic and servosystem), and output scaling controls.

Many modifications may be made in the system of the present invention without departing from the spirit and scope thereof; accordingly, the scope of the present invention is defined only by the claims appended hereto.

What is claimed is:

1. An automatic digital data processing system for automatically decoding an analog measurement signal at the input to the system into a directly readable digital form at the output of the system, comprising:
    (a) detecting means for automatically detecting the valid peak values in the analog measurement signal;
    (b) memory means for automtically storing said peak values detected by said detecting means;
    (c) first output scaling means for automatically adjusting the minimum and maximum values of the analog input signal stored in said memory means to fix the range of such signal relative to the output of the system;
    (d) calibrating means for automatically calibrating the response of the system; and
    (e) converting means for converting the peak value stored in said memory means into directly readable measurement units.

2. The system of claim 1 including function generating means for converting an analog signal having a nonlinear relationship between peak values and the information encoded in the peak values into an analog signal wherein said relationship is linear.

3. The system of claim 2 wherein said function generating means includes means for automatically generating a nonlinear response curve of multiple straight line segments wherein each of said multiple segments is automatically adjusted.

4. The system of claim 1 wherein said converting means includes voltage-to-frequency converting means for converting the analog signal stored in said memory means into a pulsed signal having a frequency proportional to the magnitude of the analog signal.

5. The system of claim 4 including second scaling means connected with said voltage-to-frequency converting means for scaling the pulsed signal to provide a digital output scaled in terms of directly readable measurement units.

6. The system of claim 5 including:
    (a) pulse counting means for counting the pulses in said pulsed signal;
    (b) means coupled to the pulse counting means for providing output indications in digital form; and
    (c) means for permanently recording the digital output indications to provide a data record in directly readable measurement units.

7. The system of claim 3 wherein:
    (a) said converting means includes voltage-to-frequency converting means for converting the analog signal stored in said memory means into a pulsed signal having a frequency proportional to the magnitude of the analog signal;
    (b) said system includes second scaling means connected with said voltage-to-frequency converting means for scaling the pulsed signal to provide a digital output scaled in terms of directly readable measurement units;
    (c) said system includes pulse counting means for counting the pulses in said pulsed signal;
    (d) said system includes means coupled to the pulse counting means for providing output indications in digital form; and
    (e) said system includes means for permanently recording the digital output indications to provide a data record in directly readable measurement units.

8. A system for automatically decoding an analog voltage signal into directly readable digital form, having a desired output unit span, comprising:
    (a) plural channel modules;
    (b) each of said plural channel modules including a crest detector for detecting and storing the maximum peak values in the analog voltage signal;
    (c) each of said plural channel modules further including a scaling amplifier for automatically setting the gain and offset of the detected analog voltage signal;
    (d) each of said channels further including a variable function generator for automatically converting a nonlinear analog voltage signal into a linear analog voltage signal;
    (e) a single control module connected with each of said channel modules;
    (f) said control module including means for selecting a single channel and converting the peak value of the analog signal stored in said single channel into a pulsed signal having a frequency proportional to the peak value of the analog signal stored in said crest detector of said single channel;
    (g) system means for scaling the pulsed signal;
    (h) said control module including means for counting and digitizing the pulses of said pulsed signal;
    (i) said control module including means for permanently recording the output of said means for counting and digitizing;
    (j) a power module for supplying power to all of the channel modules and the control module; and
    (k) means for automatically calibrating the response of the system at predetermined intervals for a predetermined range of values.

References Cited

UNITED STATES PATENTS

| | | | |
|---|---|---|---|
| 3,254,230 | 5/1966 | Wahrer | 307—88.5 |
| 3,012,195 | 12/1961 | Slocomb et al. | 324—103 |
| 2,989,741 | 6/1961 | Gordon et al. | 340—347 |
| 2,967,999 | 1/1961 | Gaebelein | 324—121 |
| 2,840,709 | 6/1958 | Blankenbaker | 250—27 |

GARETH D. SHAW, Primary Examiner.

U.S. Cl. X.R.

307—229, 260; 328—162; 340—347